United States Patent
Millen et al.

(10) Patent No.: US 10,621,975 B2
(45) Date of Patent: *Apr. 14, 2020

(54) MACHINE TRAINING FOR NATIVE LANGUAGE AND FLUENCY IDENTIFICATION

(71) Applicant: International Business Machines Corporation, Armonk, NY (US)

(72) Inventors: David Millen, Boxford, MA (US); Livy Maria Real Coelho, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/817,379

(22) Filed: Nov. 20, 2017

(65) Prior Publication Data

US 2019/0073997 A1 Mar. 7, 2019

Related U.S. Application Data

(63) Continuation of application No. 15/695,209, filed on Sep. 5, 2017.

(51) Int. Cl.
*G10L 15/06* (2013.01)
*G06N 3/08* (2006.01)
*G06N 3/04* (2006.01)
*G10L 15/02* (2006.01)
*G06F 17/27* (2006.01)
(Continued)

(52) U.S. Cl.
CPC .......... *G10L 15/063* (2013.01); *G06F 17/274* (2013.01); *G06F 17/2715* (2013.01); *G06F 17/2735* (2013.01); *G06N 3/04* (2013.01); *G06N 3/08* (2013.01); *G10L 15/02* (2013.01); *G10L 15/16* (2013.01); *G10L 15/187* (2013.01); *G10L 15/1822* (2013.01); *G10L 15/26* (2013.01); *G10L 25/51* (2013.01); *G10L 25/27* (2013.01); *G10L 2015/025* (2013.01)

(58) Field of Classification Search
None
See application file for complete search history.

(56) References Cited

U.S. PATENT DOCUMENTS 5,062,143 A 10/1991 Schmitt
5,189,727 A 2/1993 Guerreri
(Continued)

OTHER PUBLICATIONS

List of IBM Patents or Patent Applications Treated as Related, dated Nov. 20, 2017, 2 pages.
(Continued)

*Primary Examiner* — Fariba Sirjani
(74) *Attorney, Agent, or Firm* — Scully, Scott, Murphy & Presser, P.C.; Joseph Petrokaitis

(57) ABSTRACT

Training a machine by a machine learning technique for recognizing speech utterance to determine language fluency level of a user. Native speaker recorded data and language specific dictionary of heteronyms may be retrieved. The native speaker recorded data may be parsed and the heteronyms from the native speaker recorded data may be isolated. Linguistic features from the native speaker recorded data including at least linguistic features associated with the heteronyms may be extracted, and a language dependent machine learning model is generated based on the linguistic features.

8 Claims, 4 Drawing Sheets

(51) Int. Cl.
*G10L 15/16* (2006.01)
*G10L 15/187* (2013.01)
*G10L 15/18* (2013.01)
*G10L 15/26* (2006.01)
*G10L 25/51* (2013.01)
*G10L 25/27* (2013.01)

(56) References Cited

U.S. PATENT DOCUMENTS

| | | | |
|---|---|---|---|
| 5,392,419 A | 2/1995 | Walton | |
| 5,425,110 A | 6/1995 | Spitz | |
| 5,440,615 A | 8/1995 | Caccuro et al. | |
| 5,548,507 A | 8/1996 | Martino et al. | |
| 5,689,616 A | 11/1997 | Li | |
| 5,701,497 A | 12/1997 | Yamauchi et al. | |
| 8,938,670 B2 | 1/2015 | Kolo | |
| 9,275,635 B1* | 3/2016 | Beaufays | G10L 15/32 |
| 9,934,775 B2* | 4/2018 | Raitio | G10L 13/10 |
| 9,966,065 B2* | 5/2018 | Gruber | G06F 17/2705 |
| 10,042,880 B1* | 8/2018 | Bodapati | G06F 17/30377 |
| 10,431,203 B2* | 10/2019 | Millen | G06F 17/2715 |
| 2002/0196911 A1* | 12/2002 | Gao | H04M 1/271 |
| | | | 379/88.03 |
| 2007/0208569 A1* | 9/2007 | Subramanian | G10L 19/0018 |
| | | | 704/270 |
| 2010/0046842 A1* | 2/2010 | Conwell | G06F 17/30265 |
| | | | 382/218 |
| 2012/0035932 A1* | 2/2012 | Jitkoff | G01C 21/3608 |
| | | | 704/254 |
| 2012/0209853 A1* | 8/2012 | Desai | G06F 17/30675 |
| | | | 707/741 |
| 2012/0221339 A1* | 8/2012 | Wang | G10L 13/08 |
| | | | 704/260 |
| 2013/0254035 A1* | 9/2013 | Ramer | G06Q 30/0267 |
| | | | 705/14.62 |
| 2014/0156567 A1* | 6/2014 | Scholtes | G06F 17/30 |
| | | | 706/12 |
| 2014/0196133 A1* | 7/2014 | Shuster | H04L 63/126 |
| | | | 726/7 |
| 2014/0297252 A1* | 10/2014 | Prasad | G06F 17/289 |
| | | | 704/2 |
| 2014/0342320 A1 | 11/2014 | Nielson et al. | |
| 2015/0142704 A1* | 5/2015 | London | G06F 16/90332 |
| | | | 706/11 |
| 2015/0339940 A1 | 11/2015 | Aggarwal et al. | |
| 2016/0162473 A1* | 6/2016 | Cogley | G06F 17/28 |
| | | | 704/9 |
| 2016/0163312 A1* | 6/2016 | Henton | G10L 15/22 |
| | | | 704/270.1 |
| 2017/0148341 A1 | 5/2017 | Boulton et al. | |
| 2017/0178619 A1* | 6/2017 | Naik | G10L 13/027 |
| 2018/0150552 A1* | 5/2018 | Wang | G06F 17/30684 |
| 2018/0277017 A1 | 9/2018 | Cheung | |

OTHER PUBLICATIONS

Notice of Allowance dated May 23, 2019 received in parent U.S. Appl. No. 15/695,209, 22 pages.

* cited by examiner

MACHINE TRAINING FOR NATIVE LANGUAGE AND FLUENCY IDENTIFICATION

CROSS-REFERENCE TO RELATED APPLICATIONS

This application is a continuation of U.S. patent application Ser. No. 15/695,209 filed Sep. 5, 2017 which is incorporated by reference herein in its entirety.

FIELD

The present application relates generally to computers and computer applications, and more particularly to speech recognition, automatic language fluency recognition and machine learning.

BACKGROUND

Systems exist that perform automatic language or speech recognition, for example, using classification technique and/or machine learning technique such as neural networks. Language spoken is one dimension that may be used to test fluency in that language. Learning how native speakers speak their native language, for example, may aid in enhancing the fluency of spoken language for users trying to learn that language.

BRIEF SUMMARY

A method and system for machine training for native language and fluency identification may be provided. The method may be executed by one or more hardware processors. The method, in one aspect, may include training a machine by a machine learning technique for recognizing speech utterance to determine language fluency level of a user. The training, in one aspect, may include retrieving native speaker recorded data from a database. The training may also include retrieving language specific dictionary of heteronyms. The training may also include parsing the native speaker recorded data and isolating the heteronyms from the native speaker recorded data. The training may also include extracting linguistic features from the native speaker recorded data including at least linguistic features associated with the heteronyms. The training may also include generating a language dependent machine learning model based on the linguistic features. The method may also include generating a test corpus of words comprising at least the heteronyms. The method may further include receiving a test speech utterance of a user uttering the test corpus of words. The method may also include inputting the test speech utterance to the language dependent machine learning model and executing the language dependent machine learning model. The language dependent machine learning model may output a score representing the language fluency level of the user.

A system of training a machine that recognizes native speech utterance, in one aspect, may include a hardware processor and a storage device communicatively coupled to the hardware processor and storing native speaker recorded data. The hardware processor may execute a machine learning technique to train the hardware processor to recognize speech utterance to determine language fluency level of a user. The training may include the hardware processor retrieving native speaker recorded data from the storage device, retrieving language specific dictionary of heteronyms, parsing the native speaker recorded data and isolating the heteronyms from the native speaker recorded data, extracting linguistic features from the native speaker recorded data including at least linguistic features associated with the heteronyms, and generating a language dependent machine learning model based on the linguistic features. The hardware processor may further generate a test corpus of words comprising at least the heteronyms. The hardware processor may further receive a test speech utterance of a user uttering the test corpus of words. The hardware processor may also input the test speech utterance to the language dependent machine learning model and execute the language dependent machine learning model. The language dependent machine learning model may output a score representing the language fluency level of the user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
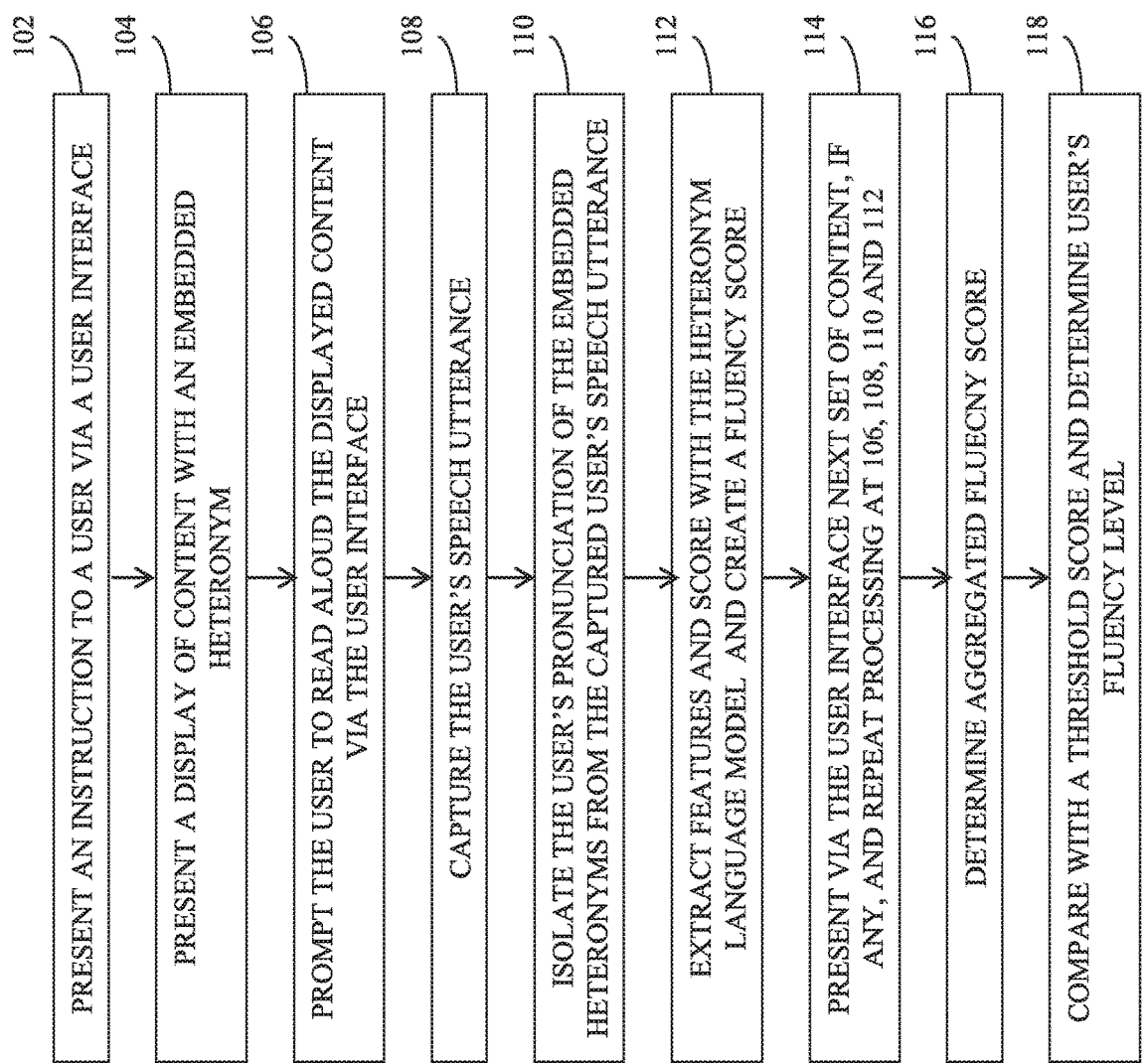
FIG. 1 illustrates an example of use case scenario for presenting test material, for example, generated according to a system and method of the present disclosure in one embodiment.

There are many benefits in human-computer interaction that come from knowing the native language of the end-user. For example, speech interfaces can be tuned to native or colloquial vocabularies and utterances, and multi-user interfaces can be personalized for different language capabilities of the users. Examples include smart-phone apps or applications that use speech input to query information from mapping applications, real-time translation applications, and spoken dialogue agent interfaces that support personal assistant capabilities (e.g., calendar, scheduling, information look-up). In this disclosure, a system, method and technique may be presented that embodies various language processes that can be analyzed linguistically to determine whether a user is a native (or fluent) speaker of a specific language (e.g., Portuguese).

A person's native language (also referred to as a first language or mother tongue) is one that a person has learned and spoken from birth. The speaker usually has a deeply nuanced understanding of the native language and is often considered an authority on many aspects of language use. Having quick and accurate methods allow identifying of the native language of a user in a human-machine system. First, it allows for the customization of the user interface to match the most natural (native) language of the user. This allows for a more natural interface. Second, for kinds of data acquisition tasks, the quality of the input may depend on different fluency level of a speaker. An example of such a data acquisition task may include crowd-sourced language transcription or translation. Another example may include crowd-sourced labeling (text) of images, which often provides an important measure of ground truth for machine-learning classifiers, which benefits from users who have a desired level of fluency in a language.

The benefits provided by the system, method and technique of the present disclosure may include, but are not limited to: Assessment protocols or techniques to determine the language fluency of a speaker, using tests that focus on different linguistic skills. These linguistic skills include, for example, correct pronunciation of heteronyms presented in context, or identification of same and/or different meaning for ambiguous utterances; Application of certified and/or qualified highly fluent speakers to crowd-sourcing tasks (e.g., transcription, translation or content labeling); Certification of language fluency for various job-related purposes.

A system and a method in the present disclosure in one embodiment determine the language fluency of an individual based on fluency test sets that differentiate native from non-native speakers. These test sets may be developed by highly trained language experts or developed using machine learning-based classifiers.

The system, for example, provides a human-machine interaction that collects data from the individual about detailed and nuanced language use. The test material may be constructed using particular language constructs (e.g., heteronyms) that are difficult for non-native or non-fluent speakers of a language, but are relatively easy for a native of highly fluent speaker. The test material is highly based on linguistic knowledge, that is, different and specific linguistic knowledge may be used (individually or combined) in order to provide a score from different linguistic skills: phonetics (pronunciation and accent), spelling, vocabulary complexity, tone, morphology, syntax, semantics, pragmatics and cultural use of language.

In more complex tests of language fluency, rule based and corpora based approaches may be also used. One or more machine learning and statistics techniques create the test corpus from general utterance examples, and also score the performance of the user on the complex tests.

Examples of machine learning and statistics techniques may include: Supervised learning such as decision trees, support vector machines, neural networks, convolution neural networks, case based reasoning, k-nearest neighbor; Unsupervised learning such as deep learning, self-organizing maps, k-means algorithm, expectation maximization; Statistic based learning such as logistic regression, Naive Bayes, discriminant analysis, isotonic separation; and/or other techniques such as genetic algorithms, group method, fuzzy sets, and rules-based.

Each performance result may have an associated weight that is adjusted and improved over time calibrating the mode with the arrival of new information.

FIG. 1 illustrates an example of use case scenarios for presenting test material, for example, generated according to a system and method of the present disclosure in one embodiment. The method may performed by at least one hardware processor. Referring to FIG. 1, at 102, an instruction may be presented to a user via a user interface. The instruction tells the user what action the user is to perform on the user interface. For example, an instruction may be to read the content displayed on the user interface aloud. At 104, the user interface presents a display of content with an embedded heteronym. For example: "I close the door close to me." Briefly, a heteronym is a word that is written identically but has a different pronunciation and meaning. At 106, the user interface prompts the user to read the displayed content, for example, a sentence out load. At 108, responsive to the user reading the content aloud or vocalizing the content, the user interface captures the user's speech utterance.

At 110, the user's pronunciation of the embedded heteronyms is isolated from the captured user's speech utterance. At 112, linguistic features are extracted from the target speech and scored using the heteronym language model. A fluency score is generated and the score associated with the user is incremented. For instance, initially the fluency score may be set at zero or another initial value. As the user pronounces the heteronyms correctly (i.e., the extracted features are scored above a threshold in the heteronym language model, the score may be updated. At 114, next utterance is presented and the processing at 106, 108, 110 and 112 may be repeated. The processing may iterate for different utterances. At 116, total score is determined for the user, for example, as the aggregated score from performing each of the utterances. At 118, if the user's score exceeds or meets a threshold, the user is determined to be highly fluent, and may be certified.

Examples of heteronyms, for example, in English language, may include (but are not limited to): My house and his apartment are enough to house everybody this weekend; I close the door close to me; After preparing the extract, you should extract the lighter substances; That is an elaborate project. Could you, please, elaborate on the goals; The global crisis and the decrease of investments will decrease the jobs opportunities as well.

Figure 2:
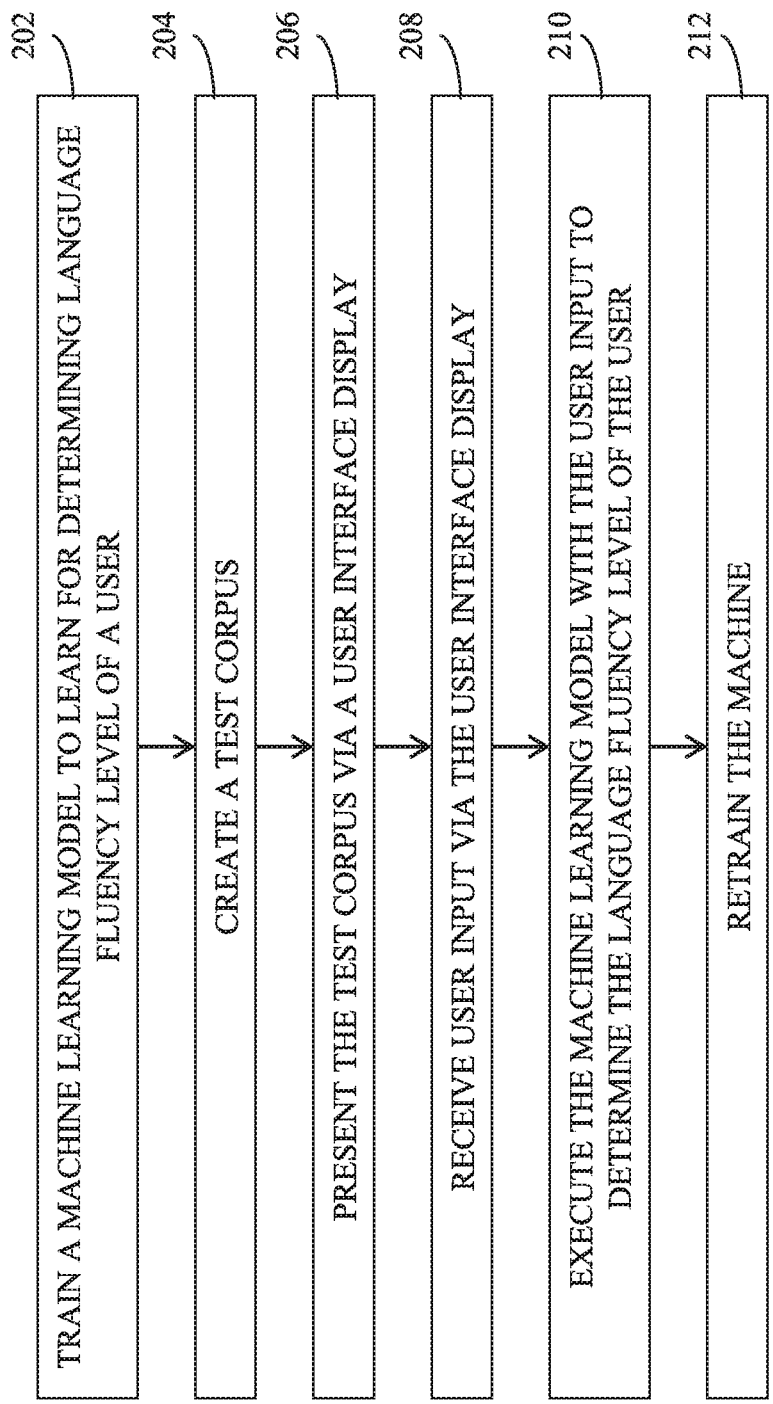
FIG. 2 is a flow diagram illustrating a method of training a machine to learn to generate a test corpus in one embodiment of the present disclosure.

FIG. 2 is a flow diagram illustrating a method of training a machine to learn to generate a test corpus in one embodiment of the present disclosure. The method may be performed by one or more hardware processors. At 202, a machine is trained by a machine learning technique to create a language model that can be used to evaluate the language fluency level of a user. For example, a machine learning model is generated based on selected features extracted from the speech utterance. These features may include phoneme duration, phoneme chains, intonation, timing, and loudness.

At 204, a test corpus of words may be created, for example, including words used in training the machine learning model. This corpus in one embodiment includes sentences with embedded heteronym pairs, and the associated feature parameters for the different pronunciation of the words.

At 206, the test corpus is presented via a user interface display. For example, test content described with reference to FIG. 1 may be presented.

At 208, user input is received via the user interface display. For example, user speech spoken through a microphone may be captured. User's answer entered on the user interface may be read and captured.

At 210, the machine learning model is executed and the user input is scored to determine the language fluency level of the user. For example, the machine learning model may output a score that indicates the language fluency level of the user.

At 212, the machine is retrained. For example, the machine learning model may be readjusted based on the user's input. In one embodiment, retraining may be done by recreating the heteronym language model using additional speech samples from native language speakers. An independent measure to determine the ground truth of the native fluency may be acquired, for example, by self-reporting during the test administration.

Figure 3:
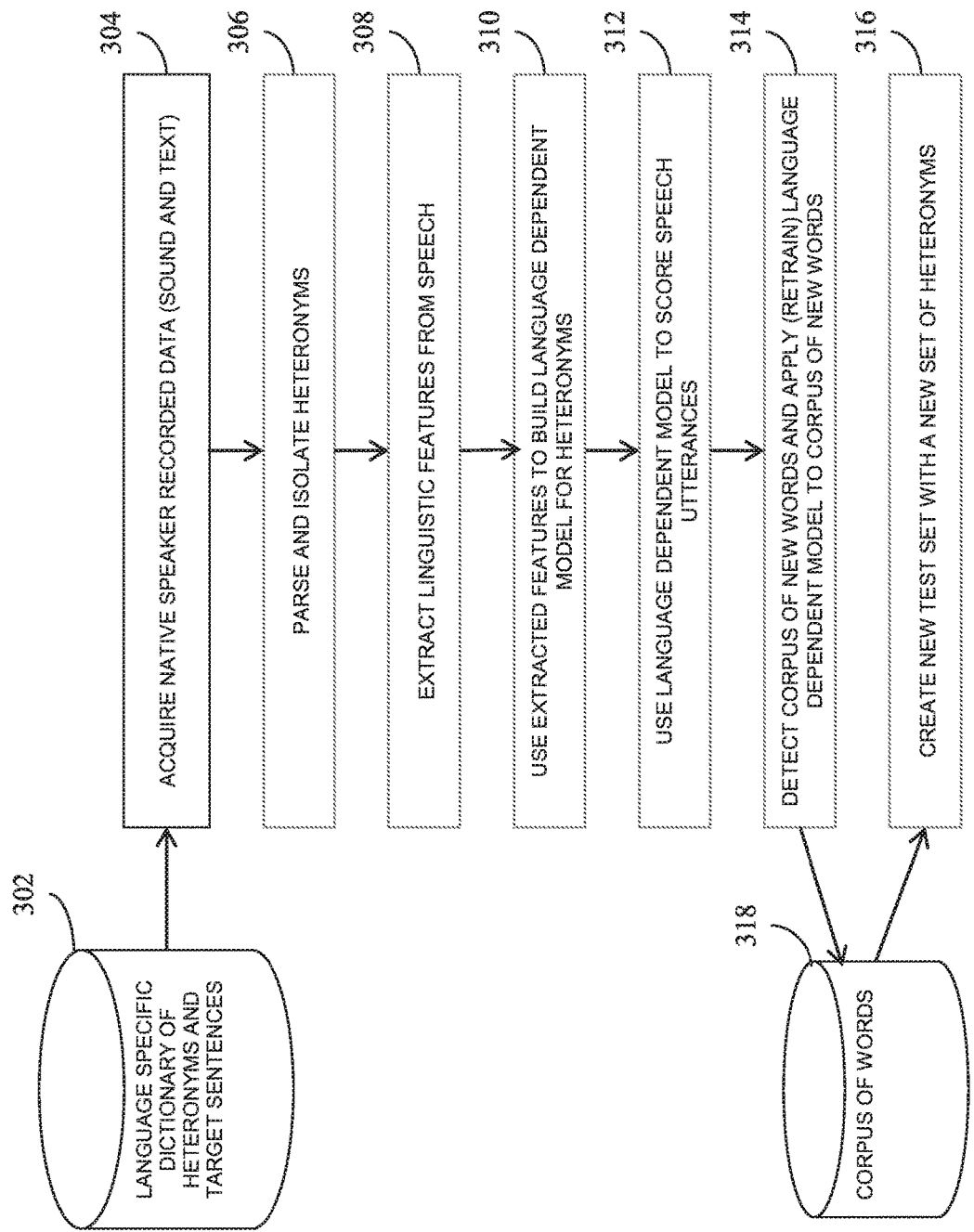
FIG. 3 is a diagram illustrating components of a system that may train a machine to learn to generate a test corpus and presenting the test corpus to a user for evaluation.

FIG. 3 is a diagram illustrating components of a system that may train a machine to learn to generate a test corpus and presenting the test corpus to a user for evaluation. FIG. 3 illustrates a machine learning component for heteronyms model. At 304, native speaker recorded data, for example, including the sound and text, may be acquired. Such data may be received or retrieved from call center databases, music databases, databases that store people reading text, crowd sourced data, and/or others. Language specific dictionary of heteronyms and target sentences 302 may be also accessed. At 306, the native speaker recorded data is parsed and heteronyms are isolated from the native speaker recorded data. Parsing the speaker recorded data and isolating (or identifying) heteronyms may be performed by executing speech processing and natural language processing techniques. For example, speech occurrence of the heteronyms from the dictionary 302 may be recognized in the native speaker recorded data and isolated. At 308, linguistic features may be extracted from the speech (the native speaker recorded data acquired at 304), particularly, the heteronyms. Examples of linguistic features may include phoneme duration, intonation, timing, and loudness. At 310, the extracted features are used to build or generate a language dependent model for heteronyms. In one embodiment, each language uses a different machine learning model, chosen by their characteristics, using meta learning. These features are used to training a machine learning model such as Deep Learning, Naïve Bayes and Random Forest. The output of the machine learning model is a score that will inform how a speech (for example, of a person) is in that language, for example, how an input speech utterance compares to a native speaker's utterance of the same speech or words. A score, for example, reflects the closeness of an input utterance to the native speaker's utterance.

At 312, the language dependent model that is generated is executed to score speech utterance, e.g., received from a user via a user interface, for instance, that is coupled to a microphone or the like that receives user's speech. For example, a test corpus of words and/or sentences including the words and/or heteronyms used in building the machine learning model may be created, and presented to a user via a user interface. The user may be allowed to read or utter the test corpus of words, and the user interface detects or receives the speech utterance. The speech utterance may be input to the machine learning model and the machine learning model may be executed, wherein the machine learning model outputs a score representing the language fluency level of the user.

At 314, the machine learning language dependent model may be applied to a corpus of new words, for example, received or accessed from a database of corpus of words (e.g., dictionaries, lexical resources, web pages, blogs, news, forums, text such as portable document format (pdf) documents stored as electronic data on one or more computers and/or computer storage devices, and/or others). In this way, the model is retrained or modified to be able to score the corpus of new words.

At 316, a new test set may be created with a new set of heteronyms, for example, from the corpus of new words 318. For instance, the new words are added to the test corpus. In one aspect, the language dependent machine learning model may retrain itself autonomously or automatically based on detecting the new set of heteronyms. For instance, a hardware processor executing the machine learning model may automatically detect the availability of new words 318 and automatically invoke the retraining.

Figure 4:
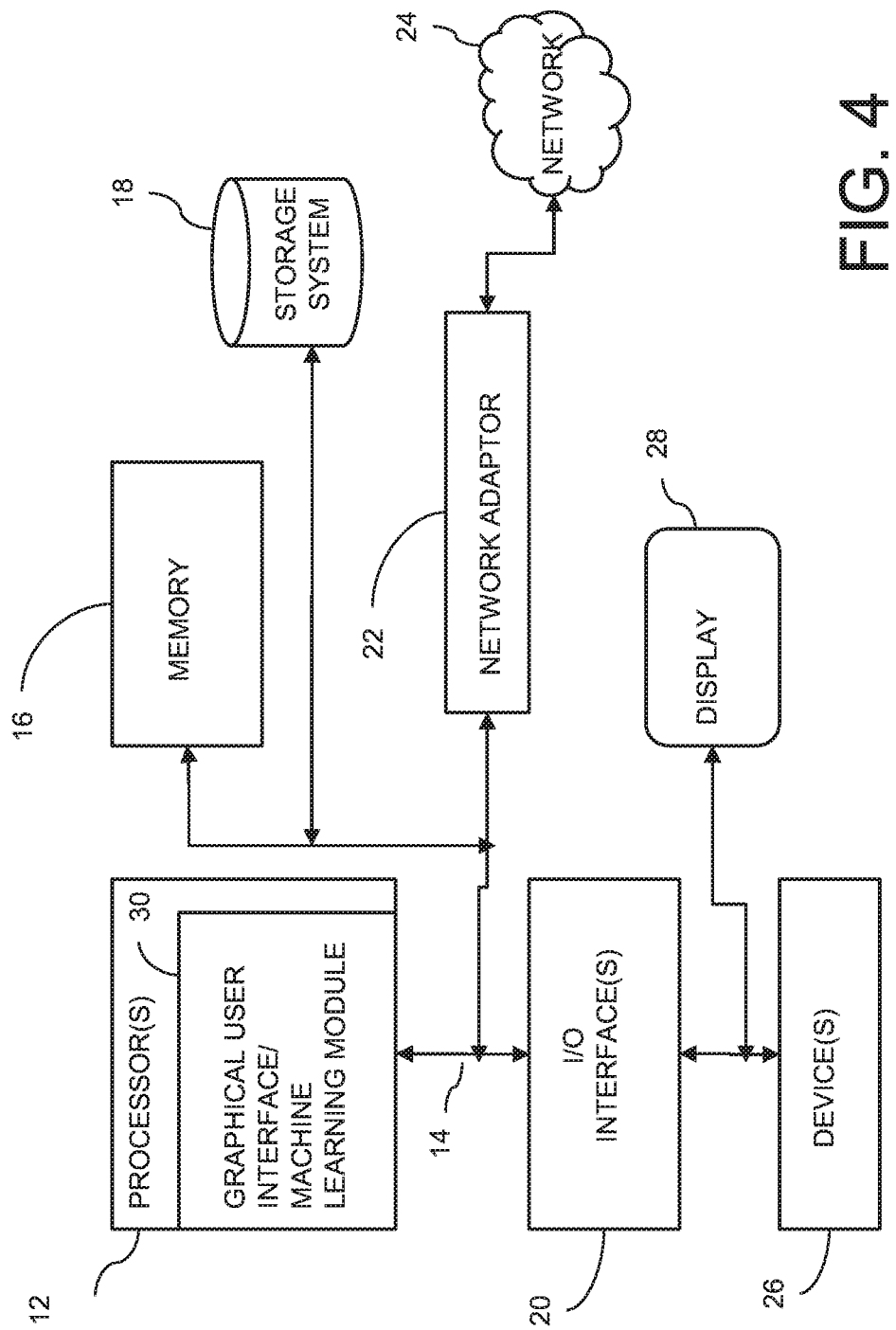
FIG. 4 illustrates a schematic of an example computer or processing system that may implement a training system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method performed by at least one hardware processor, the method comprising:
    training a machine by a machine learning technique for recognizing a speech utterance to determine language fluency level of a user,
    the training comprising at least:
        receiving native speaker recorded data from a database of recorded speech of at least one native speaker,
        receiving a language specific dictionary of heteronyms,
        parsing the native speaker recorded data and isolating the heteronyms from the native speaker recorded data,
        extracting linguistic features from the native speaker recorded data including at least linguistic features associated with the heteronyms, the linguistic features associated with the heteronyms including at least phonetics, and
        generating a language dependent machine learning model based on the linguistic features, wherein the language dependent machine learning model is trained to output a score indicating language fluency level;
    generating a test corpus of sentences, wherein at least one sentence in the test corpus includes at least one pair of heteronyms and associated feature parameters for different pronunciations of words in the pair of heteronyms, wherein heteronyms are words spelled identically but having different pronunciations and meanings from one another;
    causing presenting of a sentence from the test corpus to the user on a user interface display;
    receiving a test speech utterance of the user uttering the presented sentence;
    executing the language dependent machine learning model based on the test speech utterance;
    evaluating the language fluency level of the user based on user pronunciation, obtained from the test speech utterance by the user, of the at least two heteronyms in the presented sentence; and
    outputting a score representing the language fluency level of the user.

2. The method of claim 1, wherein the linguistic features comprise phoneme duration, intonation, timing, and loudness.

3. The method of claim 1, wherein the language dependent machine learning model comprises a deep learning model.

4. The method of claim 1, wherein the language dependent machine learning model comprises a naïve Bayes model.

5. The method of claim 1, wherein the language dependent machine learning model comprises a random forest model.

6. The method of claim 1, further comprising automatically retraining the language dependent machine learning model based on detecting a new set of heteronyms.

7. The method of claim 1, wherein the retrieving of the native speaker recorded data from a database comprises at least retrieving data from call center recordings.

8. A method performed by at least one hardware processor, the method comprising:
    training a machine by a machine learning technique for recognizing a speech utterance to determine language fluency level of a user,
    the training comprising at least:
        receiving native speaker recorded data from a database of recorded speech of at least one native speaker,
        receiving a language specific dictionary of heteronyms,
        parsing the native speaker recorded data and isolating the heteronyms from the native speaker recorded data,
        extracting linguistic features from the native speaker recorded data including at least linguistic features associated with the heteronyms, the linguistic features associated with the heteronyms including at least phonetics, and
        generating a language dependent machine learning model based on the linguistic features, wherein the language dependent machine learning model is trained to output a score indicating language fluency level;
    generating a test corpus of sentences, wherein at least one sentence in the test corpus includes at least one pair of heteronyms, wherein heteronyms are words spelled identically but having different pronunciations and meanings from one another;

causing presenting a sentence from the test corpus to the user on a user interface display;
receiving a test speech utterance of the user uttering the presented sentence;
executing the language dependent machine learning model based on the test speech utterance;
evaluating the language fluency level of the user based on user pronunciation, obtained from the test speech utterance by the user, of the at least two heteronyms in the presented sentence; and
outputting a score representing the language fluency level of the user.

* * * * *